United States Patent [19]

Dorta et al.

[11] Patent Number: 5,176,832

[45] Date of Patent: Jan. 5, 1993

[54] CHROMATOGRAPHIC SEPARATION OF SUGARS USING POROUS GEL RESINS

[75] Inventors: Antonio Dorta; Yog R. Dhingra; Bruce W. Pynnonen, all of Midland, Mich.

[73] Assignee: The Dow Chemical Company, Midland, Mich.

[21] Appl. No.: 781,462

[22] Filed: Oct. 23, 1991

[51] Int. Cl.⁵ .............................................. B01D 15/08
[52] U.S. Cl. ................................. 210/635; 210/656; 210/198.2; 210/502.1; 127/46.2; 127/46.3
[58] Field of Search ................. 127/44, 46.2, 55, 46.3; 210/635, 656, 659, 681, 198.2, 502.1

[56] References Cited

U.S. PATENT DOCUMENTS

| | | | |
|---|---|---|---|
| 2,500,149 | 3/1950 | Boyer | 260/79.3 |
| 2,591,574 | 4/1952 | McBurney | 260/89.7 |
| 2,631,127 | 3/1953 | D'Alelio | 210/24 |
| 2,664,801 | 1/1954 | Etsbein | 95/89 |
| 2,764,564 | 9/1956 | McMaster et al. | 260/2.2 |
| 2,813,810 | 11/1957 | Smith | 127/46.2 |
| 2,985,589 | 5/1961 | Broughton et al. | 210/34 |
| 3,044,905 | 7/1962 | Lefevre | 127/46 |
| 3,266,007 | 8/1966 | Sullivan | 339/198 |
| 3,326,875 | 6/1967 | Moore | 260/92.8 |
| 3,357,158 | 12/1967 | Hollis | 55/67 |
| 3,458,976 | 8/1969 | Hollis | 55/386 |
| 3,547,684 | 12/1970 | Hollis et al. | 117/95 |
| 3,663,263 | 5/1972 | Bodre et al. | 117/63 |
| 3,686,117 | 8/1972 | Lauer | 210/198.2 |
| 3,785,864 | 1/1974 | Lauer | 210/198.2 |

(List continued on next page.)

FOREIGN PATENT DOCUMENTS

| | | | |
|---|---|---|---|
| 625753 | 8/1961 | Canada | 210/198.2 |
| 0361685 | 4/1990 | European Pat. Off. | 210/198.2 |
| 36-2192 | 3/1961 | Japan | 210/198.2 |
| 728508 | 4/1955 | United Kingdom | 210/198.2 |
| 1292226 | 10/1972 | United Kingdom | 210/198.2 |

OTHER PUBLICATIONS

Welstein and Sauer, Separation of Glucose and Fructose: Effects of Resin Characteristics on Separation, Ion Exchange Technology, Naden and Streat, eds. Soc. of Chem. Ind. (1979), pp. 466-471.

Fuller, Support-Bonded Polyaromatic Copolymer Stationary Phases for Use in Gas Chromatography, Anal. Chem., vol. 44, pp. 1747-1753 (Sep. 1972).

Moore, Gel Permeation Chromatography—A New Method for Molecular Weight Distribution of High Polymers, J. Poly. Soc., vol. 2, pp. 835-843 (1964).

Sanetra et al., The Study of Modified Poly(-Styrene-Co-Divinylbenzene) by Inverse Gas Chromatographic Analysis, Die Angewandte Makromolekulare Chemie, vol. 140, pp. 41-50 (1986).

Janak, Application of Porapak ®, Porous Ethylvinylbenzene Polymers, as New Lipophilic Stationary Phases for Thin-Layer and Column Chromatography, (List continued on next page.)

Primary Examiner—Ernest G. Therkorn
Attorney, Agent, or Firm—John L. Wood

[57] ABSTRACT

The present invention is a process for the chromatographic separation of a liquid mixture comprising a first sugar component and at least one secondary component chosen from second sugars, organic acids and salts thereof, alcohols, amino acids, and inorganic salts. In the process, the liquid mixture is contacted with a stratum of a porous gel cation-exchange resin and thereafter eluted such that the first sugar component passes through the stratum at a different rate relative to the secondary components of the liquid mixture. The separation results in a first recoverable product stream rich in the first sugar component and at least one secondary product stream rich in the secondary components. The porous gel cation-exchange resin is prepared by polymerization of at least one monovinylidene monomer with a cross-linking monomer in the presence of an inert diluent. The use of such porous gel resins in the process increases kinetics, improves yields of desired sugar components, and results in a more efficient separation process. The invention is particularly applicable to separation of glucose from fructose in the preparation of high fructose corn syrup.

31 Claims, 1 Drawing Sheet

U.S. PATENT DOCUMENTS

| | | | |
|---|---|---|---|
| 4,133,696 | 1/1979 | Barker | 127/46.2 |
| 4,182,633 | 1/1980 | Ishikawa et al. | 127/46.1 |
| 4,192,921 | 3/1980 | Dales | 521/38 |
| 4,224,415 | 9/1980 | Meitzner et al. | 521/38 |
| 4,246,386 | 1/1981 | Howell et al. | 526/207 |
| 4,267,054 | 5/1981 | Yoritomi et al. | 210/659 |
| 4,283,499 | 8/1981 | Howell | 521/38 |
| 4,379,751 | 4/1983 | Yoritomi | 210/659 |
| 4,382,124 | 5/1983 | Meitzner et al. | 521/38 |
| 4,419,245 | 12/1983 | Barrett et al. | 210/681 |
| 4,443,267 | 4/1984 | Pansolli et al. | 127/46.2 |
| 4,564,644 | 1/1986 | Harris | 521/28 |
| 4,724,082 | 2/1988 | Boom | 210/679 |
| 4,837,315 | 6/1989 | Kulprathipanja | 127/46.2 |

OTHER PUBLICATIONS

Chemistry and Industry, pp. 1137–1138 (Jul. 1, 1967).

Horvath et al., Fast Liquid Chromatography. Investigation of Operating Parameters and the Separation of Nucleotides on Pellicular Ion-Exchangers, Anal. Chem., vol. 39, pp. 1422–1428 (1967).

Martinu et al., Selective Chromatographic Separation of Aromatic Hydrocarbons and Their Hydrogenated Derivatives on Porapak T, J. Chromatog., vol. 65, pp. 477–485 (1967).

Ackers, Analytical Gel Chromatography of Proteins, Advances in Protein Chemistry, vol. 24, pp. 343–446 (1970).

Bly, Gel Permeation Chromatography, Science, vol. 168, pp. 527–533 (1970).

Biesser and de Rosset, Continuous Countercurrent Separation of Saccharides with Inorganic Adsorbents, Die Starke, Hahrg. 1977, No. 11, pp. 392–397.

Food Processing, Jul. 1979, pp. 74–75.

Chemical Engineering, Jan. 24, 1983, pp. 50–52.

Wankat, Large-Scale Adsorption and Chromatography, CRC Press, Inc., Boca Raton, Fla., (1986), pp. 1–93.

Schildknecht, Polymer Processes, Interscience Publishers, Inc., New York, Chapter III, p. 69–109 (1956).

Helfferich, Ion Exchange, (McGraw-Hill 1962), pp. 35–36.

John Wiley, Mike's Laboratory Handbook of Chromatography and Allied Methods, New York, 1979, pp. 276–277 and 286–287.

Barker et al., Separation of Fructose from Carbohydrate Mixtures by Semi-Continuous Chromatography, Chemical Industries, p. 817, Nov. 17, 1983.

Ghim et al., Adsorption Characteristics of Glucose and Fructose in Ion-Exchange Resin Columns, Ind. Eng. Chem. Fundam. (1982), vol. 21, pp. 369–374.

CHROMATOGRAPHIC SEPARATION OF SUGARS USING POROUS GEL RESINS

BACKGROUND OF THE INVENTION

This invention concerns chromatographic separations and, in particular, industrial scale chromatographic separations of sugars using a cation-exchange resin as the separating medium.

Chromatographic separations of various substances can be accomplished using ion-exchange resins as the stationary phase. Such processes use anion- or cation-exchange resins to separate mixtures of organic compounds, mixtures of organic compounds and salts, mixtures of acids and salts, and salt mixtures.

Of particular commercial importance is the separation of fructose from glucose and oligosaccharides in the production of high fructose corn syrup (HFCS). In this process, liquid mixtures of glucose and fructose are passed through one or more columns containing a strong acid type ion-exchange resin, typically in the calcium form. The passage of fructose through the column is not as rapid relative to that of glucose, so there can be obtained separate product streams containing high proportions of fructose and glucose respectively. The high fructose-containing stream may then be used as a sweetener for foodstuffs, such as soft drinks. This process is illustrated by Welstein and Sauer in "Separation of Glucose and Fructose: Effects of Resin Characteristics on Separation", in *Ion Exchange Technology*, Naden and Streat, eds. Society of Chemical Industry, London, at pp. 466-471.

The ion-exchange resin conventionally employed in separation of sugars is typically a plurality of cross-linked copolymer particles which contain cation-exchange functional groups. Previous to this invention, the resin was produced in a suspension polymerization process using a low to moderate level of cross-linker and no inert diluent. See, for example, U.S. Pat. No. 3,044,905. As used hereinafter, the term "conventional gel resin" refers to resins prepared from copolymer beads made without use of an inert diluent during polymerization.

Although good chromoatographic separations of sugars are achieved using conventional gel resins, improvements which result in a faster, more efficient and/or higher yield operation are desirable. Thus, attempts have been made to modify the ion-exchange resin employed to improve kinetics.

In an otherwise similar process, use of resins having increased kinetics provide distinct advantages in comparison to use of conventional gel resins. For example, at a given product purity and yield, increased kinetics permit the column to be operated with a higher feed rate. Alternatively, increased kinetics result in higher product yields and/or purities when compared to use of conventional gel resins under substantially similar column operating conditions. Another advantage would be a reduced amount of desorbing solvent needed to elute the product from the column which reduces expenses associated with separating the desorbing solvent from the product. Increased kinetics further allow for use of larger resin particles, which permits a faster feed rate and/or higher feed concentration, thereby resulting in equivalent or better product yield and/or purity without increasing the pressure drop across the column. A resin having increased kinetics also permits an increase in column feed concentration to obtain a faster production rate.

In addition to kinetics, another important resin parameter is its flow characteristics, i.e., the ease with which a liquid mixture flows through a stratum, i.e., a column, of the resin. It is desirable that the mobile phase move rapidly through the resin at low pressures. The equipment normally used in a commercial chromatographic separation cannot withstand high pressures, so the flow rate cannot be greatly increased merely by increasing the pressure on the mobile phase.

It has been found that most modifications which improve the kinetics of conventional gel resins simultaneously diminish their flow characteristics. The kinetics of the resin can be improved by decreasing resin particle size, or increasing resin water retention capacity by reducing the amount of cross-linking monomer within the copolymer bead matrix. Unfortunately, both of these modifications diminish the flow characteristics of the resin so that, at a given pressure, a lower rate of flow of the mobile phase is obtained. Thus, benefits associated with any increase in kinetics are offset, in whole or part, by an undesirable reduction in flow characteristics.

Furthermore, a significant reduction in the degree of cross-linking is undesirable since it renders a resin more susceptible to oxidative degradation. Over a period of time, resins typically oxidize and degrade by decrosslinking of the copolymer bead matrix. Loss of cross-linking results in resin beads which are softer and more elastic in nature, which tends to increase the pressure drop across a column of the resin with a corresponding decrease in flow rate of the liquid mixture being processed. Thus, a reduction in the amount of cross-linking will decrease the useful life of the resin.

Accordingly, it would be desirable to provide a process for the chromatographic separation of sugars from a sugar-containing liquid mixture using an ion-exchange resin as the stationary phase, wherein a faster, more efficient, and higher purity separation is achieved.

SUMMARY OF THE INVENTION

The above-described objects and advantages are achieved by a process for the chromatographic separation of a liquid mixture comprising a first sugar component and at least one secondary component selected from second sugars, organic acids, amino acids, alcohols, and inorganic salts. The process provides a first recoverable product stream rich in the first sugar component and at least one second recoverable product stream rich in the secondary components. The process comprises initially contacting the liquid mixture with a stratum containing a porous gel cation-exchange resin comprising a plurality of porous gel copolymer beads functionalized with cation-exchange groups. The porous gel copolymer beads are prepared by polymerization of at least one monovinylidene monomer with a cross-linking monomer in the presence of an effective amount of an inert diluent. Thereafter, the liquid mixture is eluted such that the first sugar component passes through the resin at a rate which is different relative to the rate at which the second components pass through the resin such that the first recoverable product stream and the second recoverably product streams are obtained thereby.

BRIEF DESCRIPTION OF THE DRAWINGS

FIG. 1 is described further in Examples 1-7.

DETAILED DESCRIPTION OF THE INVENTION

Figure 1:
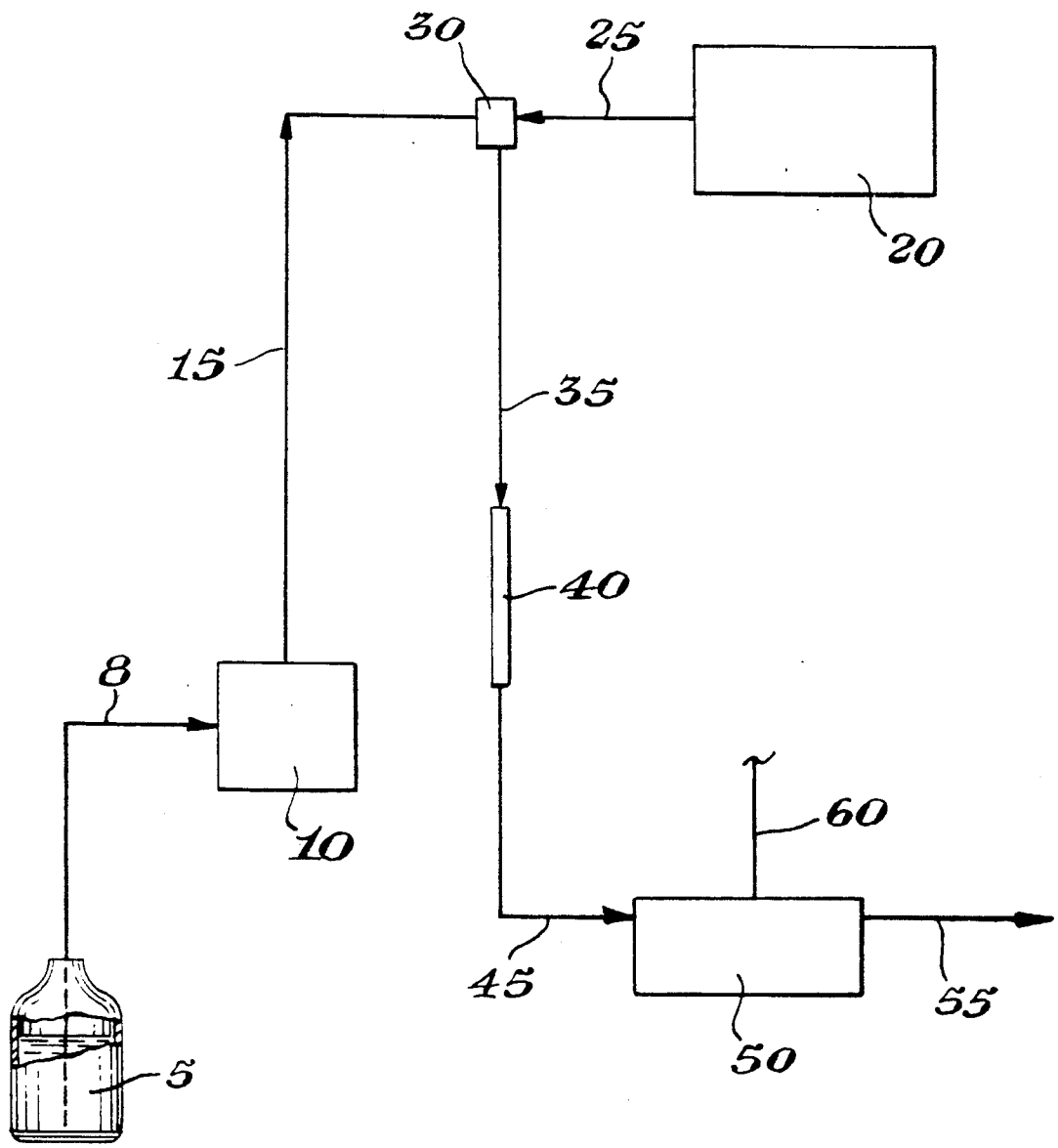
FIG. 1 is a flow diagram of apparatus that can be employed to determine a separation factor for a resin, i.e., a number which represents the ability of a resin to separate a given sugar component.

In this invention, a liquid mixture containing a first sugar component and at least one secondary component is separated into two or more product streams, each of which contains a higher proportion (relative to total solutes) of one component relative to the proportion of said component in the original liquid mixture. The secondary component is selected from one or more of the following compounds: a second sugar component that is different from the first sugar component and non-sugar components selected from inorganic salts, amino acids, alcohols, organic acids, and salts of organic acids. In preferred embodiments, the liquid mixture will include at least two sugar components. Sugars of interest herein include glucose, fructose, lactose, sucrose, maltose, gulose, galactose, sorbose, xylose, manose, isomaltose, stachyose, arabinose, tagatose, raffinose, and oligosaccharides. Of particular interest are liquid mixtures comprising fructose and glucose.

The non-sugar components are compounds which do not substantially interfere with separation of the sugar or sugars container in the liquid mixture.

Suitable inorganic salts are those which are soluble in the liquid mixture, and are preferably selected from alkali metal or alkaline earth metal halides. Examples of suitable inorganic salts are potassium chloride, sodium chloride, calcium chloride, magnesium chloride, potassium sulfate, and sodium carbonate.

Suitable amino acids are carbon-containing compounds which are soluble in the liquid mixture and have at least one amino group (—NH2) and one carboxyl group (COOH). Examples of suitable amino acids are glycine, alanine, glutamine, lysine, and phenylalanine. Preferred amino acids are those having a carbon atom content of about 10 or less, and more preferably about seven or less.

Suitable alcohols may be mono-or polyhydric in nature, and preferably have about 10 carbon atoms or less. Preferred alcohols have from one to about seven carbons. Examples of suitable alcohols are methanol, ethanol, n-propanol, iso-propanol, n-butanol, t-butanol, n-pentanol, n-hexanol, cyclohexanol, and n-octanol.

Suitable organic acids have at least one carboxyl group and have a carbon atom content of about 10 or less. Preferred organic acids have from one to about seven carbons. Examples of suitable organic acids are benzoic acid, citric acid, acetic acid, formic acid, propionic acid, butyric acid, and salts of such acids. Where the acid is in its salt form, the counterion is preferably an alkali or alkaline earth metal ion, such as sodium, potassium, or calcium.

As previously mentioned, the mixture to be separated must be in a liquid solution. Since the sugar and non-sugar components are generally solids at temperatures typically employed for the separation, a solvent therefore may be used, provided that the solvent does not undesirably interfere with the separation or react with the ion-exchange resin. Preferably the solvent is water, a polar organic solvent, or other solvent miscible with water, as these solvents swell the resin, thereby facilitating diffusion of the sugar and non-sugar components in and out of the resin.

In conducting the invention, the liquid mixture is contacted and passed through a stratum of a certain porous, gel, cation-exchange resin. The resin comprises a plurality of cross-linked copolymer beads having cation-exchange groups attached thereto. The cation-exchange groups preferably are strong or weak acid groups, more preferably they are strong acid groups, and most preferably sulfonic acid groups.

The functional groups are generally associated with a counterion. The choice of counterion depends on the particular materials being separated, but is typically a hydrogen ion, a metal ion, or an ammonium ion. Preferably, the counterion is an alkali metal or an alkaline earth metal ion. In general, more preferred ions include sodium, potassium, calcium, strontium, barium, and magnesium. For a fructose/glucose separation, the most preferred counterion is calcium.

The resin employed is characterized by its preparation from copolymer beads formed by polymerization of at least one monovinylidene monomer and a cross-linking monomer in the presence of an effective amount of an inert diluent. The term "effective amount" refers to an amount of inert diluent which results in a porous gel copolymer, but not enough to result in formation of a macroporous copolymer. The amount of inert diluent employed is discussed more fully hereinafter.

The term "macroporous" (also referred to as macroreticular) is well-known in the art and, in general, refers to resins prepared from copolymer beads which have regions of densely packed polymer chains exhibiting molecular-sized porosity which are separated by copolymer-free voids, often referred to as mesopores (50-200 Å) and macropores >200 Å). In contrast, gel-type, or microporous, resins have pores generally of molecular-size (generally less than about 50 Å). Macroporous and microporous resins are further described in U.S. Pat. Nos. 4,224,415 and 4,382,124. The porous gel resins employed in the present invention have micro- and mesoporosity, but essentially no macroporosity.

Suitable inert diluents employed in the polymerization are organic compounds which remain substantially inert with respect to polymerization of the monovinylidene and cross-linking monomers under conditions specified hereinafter. A suitable inert diluent is miscible with the monomers employed, but is a non-solvent for the resulting copolymer. Inert diluents are generally organic compounds having boiling points greater than about 60° C. and include, for example, aromatic hydrocarbons, aliphatic hydrocarbons, aliphatic alcohols, and halogenated hydrocarbons. Illustrative of such organic compounds are pentane, hexane, heptane, iso-octane, benzene, toluene, xylene, chlorobenzene, methylene chloride, ethylene dichloride, ethylene dibromide, trichloroethylene, tert-amyl alcohol, n-butanol, sec-butanol, 2-ethylhexanol, and decanol. Other suitable inert diluents are described in U.S. Pat. No. 3,176,482.

Generally, an effective amount of inert diluent is an amount which is sufficient to substantially avoid phase separation leading to preparation of a macroporous copolymer. As used herein, the term "inert diluent level" refers to a percentage derived by taking the weight ratio of inert diluent to the monomers employed (based upon total weight of the monovinylidene and cross-linking monomers) and multiplying the ratio by 100. In general, the inert diluent level is advantageously from about 5 to about 50 percent, preferably from about 10 to about 40 percent, and more preferably from about 20 to about 30 percent. However, it is believed that the optimum amount of inert diluent, in terms of improved chromatographic separation performance, will vary depending upon the particular monomers employed, the proportion of cross-linking monomer within the mixture being polymerized, and the inert diluent employed. An effective amount of inert diluent suitably increases the water retention capacity for the resulting porous gel resin when compared to an otherwise similar conventional gel resin. The increase in water retention capacity is desirably from about 1 to about 15 percent, and preferably from about 2 to about 7 percent when compared to the water retention capacity for an otherwise similar conventional gel resin.

The term "otherwise similar conventional gel resin" referred to herein means that such resin is prepared from gel copolymer beads made without use of an inert diluent. By "otherwise similar," it is meant that the conventional gel resin is made from the same monomers and has a crosslink level, counterion, and dry weight capacity substantially similar to the porous gel resin to which it is compared.

The monomers employed herein include addition polymerizable monovinylidene compounds. Such monomers are well-known and reference is made to *Polymer Processes*, edited by Calvin E. Schildknecht, published in 1956 by Interscience Publishers, Inc., New York, Chapter III, pp. 69–109 for purposes for illustration, the relevant teachings of which are incorporated herein by reference. In Table II on pp. 78–81 of Schildknecht, a diverse number of suitable monovinylidene monomers are listed which can be employed in practicing the present invention. Of particular interest are water-insoluble monomers which include monovinylidene aromatic compounds such as styrene, vinyl naphthalene, alkylene-substituted styrenes (particular monoalkyl-substituted styrenes such as vinyltoluene and ethyl vinylbenzene) and halo-substituted styrenes such as bromo- or chlorostyrene and vinylbenzylchloride; esters of $\alpha,\beta$-ethylenically unsaturated carboxylic acids, particularly acrylic or methacrylic acids, such as methyl methacrylate and ethylacrylate; and mixtures of one or more of the above-described monomers. Preferred monovinylidene monomers are the monovinylidene aromatics, particularly styrene, vinylbenzylchloride, a monoalkyl- or halo-substituted styrene, and mixtures thereof.

A variety of cross-linking monomers may be employed in preparing suitable porous gel copolymer beads. Such monomers are well known and reference is made to the Schildknecht article, previously incorporated herein. Preferred cross-linking monomers are water-insoluble polyvinylidene aromatics, such as divinylbenzene, divinyltoluene, divinylxylene, divinylnaphthalene, trivinylbenzne, divinyldiphenyl ether, and divinyldiphenylsulfone. Also suitable as a cross-linking monomer are polyvinylidene $\alpha,\beta$-ethylenically unsaturated carboxylic acids and esters thereof, such as diverse alkylene diacrylates and alkylene dimethacrylates.

The copolymer beads may be prepared by suspension polymerization methods generally known in the art. Suitable methods include, for example, a single-stage polymerization process described by F. Helfferich, *Ion Exchange*, (McGraw-Hill 1962), at pages 35–36, wherein a water-immiscible monomer mixture is suspension polymerized in a continuous aqueous phase.

Generally, the cross-linking monomer is employed in an amount of from about 1 to about 10 weight percent, preferably from about 3 to about 8 weight percent, and most preferably from about 4 to about 7 weight percent, based on total weight of the monovinylidene monomer and cross-linking monomer. The weight ratio of the monomer phase to the continuous aqueous phase is typically from about 0.5 to about 2. A free-radical initiator to assist with inducting polymerization and various suspending agents are also employed.

Also suitable for preparing the copolymer beads is a multi-stage polymerization process. A multi-stage process, also known as a "seeded" process, adds monomers in two or more increments, each increment comprising at least about 5 percent, and preferably at least about 10 percent of the total weight of the monomers employed. Each increment is followed by complete or substantial polymerization of the monomers therein before adding a subsequent increment. Suitable multi-stage processes are described in U.S. Pat. Nos. 4,419,245 and 4,564,644, British patent 1,292,226, and Japanese Koho 36-2192 (Mar. 28, 1961), the relevant teachings of which are incorporated herein by reference.

A multi-stage process typically comprises providing a suspension of polymeric seed particles within a continuous suspending medium and then subsequently polymerizes them with additional monomer. The process may be conducted as a batch-type process, such as that described in British Patent GB-A-728508, or the additional monomer may be added continuously or intermittently to the suspended seed particles under polymerizing conditions, such as in U.S. Pat. Nos. 4,419,245 and 4,564,644. The methods can vary in terms of the amount of monomers used in each stage, the proportion of cross-linking monomer used in each stage, and the conditions under which the monomers are added in each stage.

In a batch-type process, seed particles comprising from about 10 to 85 weight percent of the product copolymer beads are produced from a first monomer mixture in an initial step. In a subsequent step, a second monomer mixture containing free radical initiator is added to the seed particles, imbibed thereby, and then polymerized. This process is characterized by the presence of a free radical initiator in the second monomer mixture and by adding the mixture to the seed particles under conditions so that substantially no polymerization occurs until the mixture is substantially imbibed by the seed particles. In this process, the seed particle is advantageously prepared from a monomer mixture containing from about 0.1 to about 8 and preferably from about 0.5 to about 6 weight percent cross-linking monomer. The monomer mixture imbibed by the seed may contain from about 1 to about 15, preferably about 4 to about 10 weight percent cross-linking monomer, provided that the overall proportion of cross-linking monomer in the copolymer bead product is no greater than about 10 weight percent, as previously described.

In a preferred process, a monomer mixture containing essentially no free radical initiator is added to the seed copolymer particles under polymerizing conditions. This monomer mixture preferably comprises about 10 to about 80, and more preferably from about 25 to about 75 weight percent of the final copolymer particles. The copolymer particles formed in earlier stages contain a source of free radicals so that, upon migration to the copolymer particles, the monomer mixture polymerizes therein. Such free radical source may be a previously imbibed initiator, or the residue of a partially polymerized monomer mixture from a preceding polymerization stage. Such a process is described in U.S. Pat. No. 4,564,644, previously incorporated by reference.

In one embodiment of the preferred process, the copolymer is prepared by conducting an initial step wherein seed copolymer particles are swollen with a first monomer mixture containing desirably from about 1 to about 8, preferably about 1.5 to about 6, and more preferably about 2 to about 5 weight percent cross-linking monomer, and the monomer mixture is partially polymerized therein. The seed particles advantageously comprise about 10 to about 70, and preferably from about 25 to about 60 weight percent of the product copolymer beads and have a cross-linking monomer content of desirably from about 0.1 to about 8, preferably from about 0.5 to about 6, and more preferably from about 0.75 to about 5 weight percent based on total weight of monomer in the seed particles. The first monomer mixture is advantageously polymerized to about 20 to about 90, and preferably about 50 to about 75 percent conversion. In a subsequent step, a second monomer mixture containing from about 1 to about 15, preferably about 2 to about 8, and more preferably from about 2 to about 6 weight percent cross-linking monomer, but essentially no free radical initiator, is continuously added to the partially polymerized particles under polymerizing conditions. The second monomer mixture can be added to the particles at any convenient rate, and generally, adding the second monomer mixture at a relatively constant rate over a period of from about 0.5 to about 10 hours is sufficient. After addition of the monomer feed, polymerization is typically continued until conversion of monomers to copolymer is at least about 95 percent.

Where the copolymer bead matrix is prepared by a multi-stage polymerization process, the inert diluent may be added at any stage, i.e., to the seed particles, the added monomer mixtures, or both, to obtain a porous gel copolymer bead suitable for conducting the present invention. In preferred embodiments of the invention, the inert diluent is added to polymerization stages having a large proportion of cross-linking monomer relative to other polymerization stages. For example, inert diluent is preferably added to monomers employed in making the seed particles where subsequent polymerization stages employ relatively small proportions of cross-linking monomer. Conversely, the inert diluent is preferably added to monomer mixtures employed in subsequent polymerization stages which contain a greater proportion of cross-linking monomer compared to that of the seed particles. In more preferred embodiments, the inert diluent is employed in polymerization stages having at least about 2 weight percent, and most preferably at least about 4 weight percent cross-linking monomer, based on the weight of all monomers in such stage.

The free-radical initiator may be any of a diverse number of well known conventional initiators. Representative initiators are UV radiation and chemical initiators including azo compounds such as azobisisobutyronitrile; and peroxygen compounds such as benzoyl peroxide, t-butyl peroctoate, t-butyl perbenzoate and isopropyl percarbonate. Other suitable initiators are disclosed in U.S. Pat. Nos. 4,192,921; 4,246,386; and 4,283,499.

The free-radical initiator is employed in an effective amount sufficient to induce polymerization of the monomeric components of a monomer mixture. An effective amount will generally vary depending on a variety of factors, including the type of initiator employed, and the type and proportion of monomers being polymerized. Generally, the initiator is employed in amounts from about 0.02 to about 1 weight percent based on the total monomer weight.

The copolymer beads may be converted to sulfonated, strong acid, cation-exchange resin using techniques well-known in the art. For example, sulfonated resin may be prepared from the copolymer beads using methods described, for example, in U.S. Pat. Nos. 3,266,007; 2,500,149; 2,631,127; 2,664,801; and 2,764,564 and F. Helfferich, supra, the relevant teachings of which are incorporated herein by reference. In general, sulfonated cation-exchange resins are prepared by reacting the copolymer beads with a sulfonation agent, such as concentrated sulfuric acid (acid which has at least about 95 weight percent sulfuric acid based upon total weight), oleum, chlorosulfonic acid, or sulfur trioxide, at a temperature and for a time sufficient to achieve a desired degree of sulfonation. A preferred sulfonation agent is concentrated sulfuric acid. The amount of concentrated sulfuric acid should be sufficient to provide adequate mixing during reaction, with a weight ratio of acid to beads of from about 6:1 to about 20:1 being generally sufficient. Typically, the acid and copolymer beads are maintained at a temperature of from about 0° C. to about 200° C. for a time sufficient to obtain resin having a dry weight capacity of at least about 0.5 milliequivalents per gram (meq/g). Where the resin is substantially completely sulfonated, dry weight capacity is preferably at least about 5 meq/g.

Resins in which only a specific region of the copolymer is functionalized may also be employed in this invention. Examples of such resins are those in which only the exterior portion, or shell, is functionalized, such as that described in European Patent Application EP-A-0 361 685.

After sulfonation, the resin is hydrolyzed by washing with water and, in some instances, converted to a metal salt. The resin is preferably washed initially with a series of aqueous sulfuric acid solutions, each of which is successively more dilute in comparison to the sulfuric acid solution used in the preceding acid wash, and finally with water. Thereafter, the washed resin may be converted to a desired metal salt form by contact with a saturated aqueous solution of water-soluble metal salt or base having the desired metal counterion. For example, the resin can be converted to its calcium form by contact with a calcium chloride or calcium hydroxide solution. The resin may be converted to other forms in like manner using suitable water-soluble salts of the desired metal.

Water retention capacity of a resin is determined by swelling a weighed amount of resin with water, removing excess water and weighing the fully swollen resin. The resin is then dried on a moisture balance until a constant weight is obtained. Water retention capacity is the ratio of water imbibed to the total combined weight of the resin plus imbibed water. Water retention capacity, on a fully functionalized basis, is advantageously at least about 40 percent. However, preferred resins have a water retention capacity of from about 45 to about 85 percent, more preferably from about 55 to about 70 percent, and most preferably from about 60 to about 65 percent. As used herein, water retention capacity is measured with the resin in its hydrogen form, unless specified otherwise.

The resin preferably has an average particle diameter of from about 100 to about 1000, more preferably from about 200 to about 600, and most preferably from about 350 to about 500 micrometers ($\mu$m). In addition, it preferably has a relatively narrow particle size distribution, with at least about 50 volume percent and preferably at least about 85 volume percent of the particles having a diameter which is between ±15 percent of the volume average particle diameter. Particle diameters and size distributions for a discrete sample of resin may be determined by using a HIAC Criterion Model PC-320 Particle Size Analyzer available from The Pacific Scientific Company, or an equivalent instrument designed to make such measurements.

In the process of this invention, the liquid mixture to be separated is contacted with a stratum of the porous gel resin under conditions such that passage of the first sugar component through the stratum proceeds at a rate which is different than the rate for the secondary components of the liquid mixture. Advantageously, the stratum is a column of the resin provided by packing a vessel, such as a chromatography column, with an amount of resin sufficient to result in separation of the desired components. After the liquid mixture is contacted with the stratum, it is eluted therefrom in known manner using a solvent for the components of the mixture. In this manner, the products eluted from the stratum comprise a first recoverable product stream which is rich in the first sugar component and at least one second recoverable product stream which is deficient in the first sugar component. Preferably, the process produces at least two recoverable product streams, each of which is relatively pure in a given sugar or non-sugar component relative to the other recoverable product streams. Processes for chromatographic separations using ion-exchange resins are known, and are described, for example, by Wankat, *Large-Scale Adsorption and Chromatography*, CRC Press, Inc., Boca Raton, Fla. (1986) and U.S. Pat. Nos. 4,182,633 and 2,985,589, the teachings of which are incorporated herein by reference.

The conditions of the separation depend to a large extent on the particular liquid mixture being separated. In general, the temperature at which the separation is conducted is limited by the freezing point, boiling point, and viscosity of the liquid mixture being separated, as well as the temperature at which the sugar components, non-sugar components, or the resin itself begins to decompose. Temperatures from about 20° C. to about 100° C. are generally preferred.

The concentration of all sugar and non-sugar components in the liquid mixture is advantageously in the range of from about 1 percent to about 95 weight percent based on total weight of the mixture. It is preferred to use as high a concentration of sugar and non-sugar components as possible to avoid removing large amounts of solvent from product streams. The feed concentration also depends somewhat on temperature, as highly concentrated sugar solutions tend to be highly viscous at lower temperatures. Where non-sugar components are present in the liquid mixture, it is preferred that they be present in an amount less than about 60 weight percent, and more preferably less than about 30 weight percent based on the weight of all sugar and non-sugar components in the mixture.

The liquid mixture flow rate may vary widely, and is partially dependent on the particular mixture being separated. A flow rate of about 0.1 to about 20, preferably about 0.25 to about 5, more preferably about 0.4 to about 2 bed volumes (the term "bed volume" refers to a volume of fluid equal to the volume of the resin bed) per hour can be used in most separations.

The volume of desorbing solvent, i.e., an eluent, used can vary widely, and is not particularly critical. In general, it is preferred to minimize the use of desorbing solvent so that smaller quantities of desorbing solvent must be removed from product streams. For example, in continuous processes, from about 0.1 to about 20, preferably about 1 to about 8, more preferably about 2 to about 4 times the volume of the feed mixture can be used. In batch or pulsed mode processes, up to about 50 bed volumes are advantageously used.

In the preferred fructose/glucose separation, an aqueous solution containing a mixture of fructose and glucose, such as that obtained from an isomerization process, is passed through the resin bed and eluted with water, so that there is obtained a product mixture containing a higher relative concentration of fructose. The product mixture advantageously contains at least about 50 percent fructose, preferably at least about 55 percent fructose, more preferably about 55 to about 99 percent fructose. The separation is preferably conducted at a temperature of about 20° C. to about 80° C., more preferably about 40° C. to about 70° C., most preferably about 50° C. to about 60° C., in order to minimize viscosity and microbial growth without substantially degrading the sugars. The concentration of sugar components within the feed is advantageously from about 30 to about 75, more preferably from about 45 to about 65, most preferably from about 50 to about 60 percent by weight of the liquid mixture. Flow rates are advantageously about 0.1 to about 20, preferably about 0.25 to about 2.5, and more preferably about 0.4 to about 1.5 bed volumes per hour. Eluent volumes are advantageously about 0.1 to about 20, preferably about 1 to about 8, more preferably about 2 to about 4 times the feed volume.

Although a straight elution process can be used, greater efficiency and better separations are obtained commercially with the use of recycling or countercurrent, simulated countercurrent or pseudo-moving bed (simulated moving bed) processes. Such processes are described, for example, in Wankat, supra, *Food Processing*, July 1979, pp. 74–75, *Chemical Engineering*, Jan. 24, 1983, pp. 50–52, and Bieser and de Rosset, "Continuous Countercurrent Separation of Saccharides with Inorganic Adsorbents", *Die Staarke, Jahrg.* 1977, No. 11, pp. 392–397, all incorporated herein by reference.

The porous gel resins employed in the present invention exhibit improved kinetics and separation efficiency when compared with conventional gel resins. When the porous gel resins previously described herein are employed in a chromatographic process, the percent yield of the first sugar component is advantageously at least about 5 percent, preferably at least about 10 percent, and most preferably at least about 20 percent greater than the percent yield obtained for an otherwise similar conventional gel resin having substantially similar or better flow characteristics in an otherwise similar process. As used herein, the term "percent yield" refers to a percentage calculated by multiplying a ratio by 100, the ratio being the amount of a desired component recovered at a given purity divided by the amount of the desired component in the liquid mixture to be separated. The term "purity" means that the weight ratio of the desired component to all sugar and non-sugar components in the product stream is a certain desired percentage, such as 80 percent.

The separation efficiency of a porous gel resin may also be evaluated by comparing its separation factor for recovering a desired sugar component from a liquid mixture and comparing it with the separation factor of another porous gel resin and/or a conventional gel resin. Separation factor (SF) is a number which can be calculated from separation data generated in a high performance liquid chromatography (HPLC) procedure described in Examples 1–7 hereinafter. In general, the SF for a desired sugar component may be determined by injecting an aliquot of solutions containing the sugar and non-sugar components into the HPLC apparatus as described in Examples 1–7 hereinafter, and then calculating SF from chromatogram data according to the following equation:

$$SF = (t_n - t_m)/t_{n\frac{1}{2}}$$

wherein:
- $t_n$ is the elapsed time which corresponds to the maximum height of the retarded component peak relative to the time at which the aliquot is injected;
- $t_m$ is the elapsed time which corresponds to the maximum height of the non-retarded component peak relative to the time at which the aliquot is injected; and
- $t_{n\frac{1}{2}}$ is the elapsed time corresponding to the width, in time units such as minutes, of the retarded component peak measured at one-half of the maximum peak height.

The time units for $t_n$, $t_m$, and $t_{n\frac{1}{2}}$ should be the same, such as in minutes, in order to obtain a dimensionless number. A resin with a larger SF results in a sharper, more distinct, chromatographic separation of the desired component relative to resins with a smaller SF.

The porous gel resins employed in the present invention have a SF for a desired sugar component which is advantageously at least about 5 percent, preferably at least about 10 percent, more preferably at least about 20 percent greater than the SF of an otherwise similar conventional gel resin.

SPECIFIC EMBODIMENTS OF THE INVENTION

The following examples are provided to illustrate the invention, but are not intended to limit the scope of the appended claims. All parts and percentages are by weight and temperatures are in degrees Celsius (° C.), unless otherwise indicated.

EXAMPLES 1–7

Preparation and Evaluation of Porous Gel Resins

In a 4 liter polymerization kettle, a monomer phase consisting of measured amounts of styrene, a commercially available 55 percent divinylbenzene solution (the balance of this solution being essentially ethylvinylbenzene), iso-octane as an inert diluent, and as polymerization initiators, t-butyl perbenzoate and a 50 percent solution of t-butyl peroctoate, is suspended in a continuous aqueous phase. The divinylbenzene solution is commercially available from the Dow Chemical Company. The aqueous phase consists of measured amounts of a 60 percent aqueous solution of sodium dichromate, a 1 percent aqueous carboxymethyl methylcellulose (CMMC) solution, and water. The amounts of such materials employed in each example are given in Table I. The inert diluent level, as this term is previously defined herein, is also given in Table I.

TABLE I

RESIN PREPARATION DATA FOR EXAMPLES 1–7 AND COMPARATIVE EXAMPLES A–B

| Example No. | Styrene (gms) | DVB Solution (gms) | Iso-Octane (gms) | t-BPO[1] (gms) | t-BPB[2] (gms) | Sodium Dichromate Solution (gms) | CMMC Solution (gms) | Water (gms) | Inert[3] Diluent Level (%) |
|---|---|---|---|---|---|---|---|---|---|
| 1 | 583.5 | 66.5 | 32.5 | 0.47 | 0.31 | 1.1 | 204.7 | 477.8 | 5 |
| 2 | 583.5 | 66.5 | 65 | 0.47 | 0.31 | 1.2 | 214.5 | 500.5 | 10 |
| 3 | 448.8 | 51.2 | 75 | 0.36 | 0.24 | 2.5 | 450 | 1050 | 15 |
| 4 | 673.3 | 76.8 | 150 | 0.30 | 0.36 | 1.5 | 270 | 630 | 20 |
| 5 | 897.7 | 102.3 | 250 | 0.72 | 0.48 | 2.1 | 375 | 875 | 25 |
| 6 | 583.5 | 66.5 | 195 | 0.47 | 0.31 | 1.4 | 253.5 | 591.5 | 30 |
| 7 | 583.7 | 66.3 | 273 | 0.47 | 0.31 | 1.4 | 276.9 | 646.1 | 42 |
| A | 583.5 | 66.5 | 0 | 0.47 | 0.31 | 1.1 | 195 | 455 | 0 |
| B | 583.5 | 66.5 | 474 | 1.95 | 1.30 | 1.9 | 337 | 787 | 73 |

[1] t-BPO refers to tert-butylperoctoate
[2] t-BPB refers to tert-butylperbenzoate
[3] Inert diluent level (%) = (grams diluent/grams styrene − divinylbenzene)*100.

After charging the kettle, agitation is initiated at a rate of 350 revolutions per minute (RPM) for 30 minutes. The kettle is then sealed, nitrogen purged, and maintained at a temperature of 75° C. for 10 hours with the same degree of agitation. Thereafter, the kettle is maintained at a temperature of 95° C. for another 1.5 hours and finally at 120° C. for an additional 5 hours. The resulting copolymer beads are recovered from the reactor, washed thoroughly with water, and dried. The copolymer beads have a divinylbenzene content of 5.7 percent, based on the total weight of the copolymer beads.

The resulting copolymer beads are then sulfonated by a conventional method. The copolymer beads are slurried with methylene chloride, a swelling agent, and a concentrated 99 weight percent sulfuric acid solution and allowed to swell for 30 minutes. The amount of methylene chloride employed is sufficient to provide a weight ratio of methylene chloride to the copolymer beads of 1:2.5. The amount of acid employed is sufficient to provide a weight ratio of acid to the copolymer beads of 10:1. The swollen copolymer beads are thereafter sulfonated by heating the slurry to a temperature of 90° C. which is then maintained for 5 hours.

The sulfonated beads are hydrated gradually by washing them with increasingly dilute aqueous sulfuric acid solutions. The sulfonated beads are initially washed with an excess of a 43 weight percent aqueous sulfuric acid solution. This is followed by a wash with an excess of a 19 weight percent aqueous sulfuric acid solution, and thereafter with an excess of a 5 weight percent aqueous sulfuric acid solution. The sulfonated copolymer beads are finally washed with water to a neutral pH and their water retention capacity (WRC) and dry weight capacity (DWC) in the hydrogen form is determined.

The washed beads are converted to resin in the calcium form by contact with a 50 percent excess of a saturated calcium hydroxide solution. Thereafter, the resulting resin beads are thoroughly washed with water to a neutral pH. The resin is tested again to determine WRC in the calcium form. The results of such tests are given in Table II.

TABLE II

RESIN PROPERTIES FOR EXAMPLES 1-7 AND COMPARATIVE EXAMPLES A-B

| Example No. | Inert Diluent Level (%) | DWC (meq/g) | WRC in Ca$^{++}$ Form (%) | WRC in H$^+$ Form (%) | S.F. |
|---|---|---|---|---|---|
| 1 | 5 | 5.3 | 49.6 | 60.3 | 0.56 |
| 2 | 10 | 5.2 | 50.2 | 60.8 | 0.58 |
| 3 | 15 | 5.3 | 50.7 | 61.3 | 0.61 |
| 4 | 20 | 5.1 | 52.7 | 62.4 | 0.67 |
| 5 | 25 | 5.3 | 53.6 | 64.7 | 0.71 |
| 6 | 30 | 5.3 | 54.1 | 65.6 | 0.69 |
| 7 | 42 | 5.3 | 55.5 | 66.7 | 0.68 |
| A | 0 | 5.2 | 48.5 | 59.1 | 0.53 |
| B | 73 | 5.3 | 68.9 | 76.9 | 0.53 |

DWC is determined by well-known analytical techniques. WRC is determined by the method previously described.

To determine a SF for each resin, about 100 ml of a resin, in the hydrogen form, is placed in a commercial Waring blender and comminuted at high speed until at least 20 ml of resin is obtained, after screening, having a particle diameter of from 210 to 250 μm. Thereafter, the resin is converted to the Ca$^{++}$ form by contact with 250 ml of an 8 weight percent calcium chloride solution for 30 minutes. The resin is then thoroughly washed with water. A 10 ml portion of the resin is loaded into a 10×15 cm Omnifit glass column which is vibrated to obtain uniform packing within the column.

Apparatus employed to determine SF is illustrated diagrammatically by FIG. 1. Water employed as an eluent is contained within container 5 and is drawn through line 8 by pump 10. Pump 10 is a Beckman Model 110B HPLC pump. Water exits pump 10 through line 15 which connects with line 25 at a "T" fitting 30. Line 25 conveys a dilute sugar solution from an automatic sampler 20 which is an Anspec Model An-728 auto-injector. The dilute sugar solution is conveyed by line 35 to the glass column 40 which contains the resin sample as previously described. Column effluent is conveyed by line 45 to a Erma Model ERC-7512 refractive index detector 50. Electrical signals transmitted by the refractive index detector 50 are conveyed by leads 60 to a Hewlett-Packard HP3396A recorder/integrator (not shown). The Hewlett-Packard recorder/integrator automatically determines $t_n$, $t_m$, and $t_{n\frac{1}{2}}$, as previously defined herein. Column effluent leaves the refractive index detector by line 55.

For each resin, water is initially eluted at a constant flow of 0.4 cubic centimeters per minute (cm$^3$/min) through column 40 until a stable baseline registers on the recorder/integrator. Thereafter, a 50 microliter (μl) aliquot of a 0.05 weight percent aqueous fructose solution is injected through the automatic sampler 20 and $t_n$ and $t_{\frac{1}{2}n}$ are determined by the column in the same manner and $t_m$ is determined. The flow of water is maintained at a constant rate of 0.4 cm$^3$/min during elution of these sugar solutions. SF is then calculated by the formula previously given herein. The above procedure is substantially repeated for each resin prepared in Examples 1-7. The SF for fructose measured for each resin is given in Table II.

The results of Examples 1-7, taken with the results of Comparative Example A, show that incorporation of an inert diluent within the monomer mixture being polymerized results in an increased water retention capacity for the resin and at least about a 5 percent increase in SF relative to a conventional gel resin (Comparative Example A).

COMPARATIVE EXAMPLE A

The procedure of Example 1 is substantially repeated, except no iso-octane is added to the kettle. The materials and amounts thereof charged t the kettle are given in Table I. The copolymer beads have a divinylbenzene content of 5.7 percent based on total monomer weight.

The resulting conventional gel cation-exchange resin is tested as in Example 1. The results are given in Table II.

COMPARATIVE EXAMPLE B

The procedure of Example 1 is substantially repeated, except an amount of iso-octane sufficient to result in a macroporous copolymer is added to the kettle. The amounts of monomers, iso-octane, initiators, sodium dichromate solution, CMMC solution, and water are given in Table I. Polymerization and sulfonation of the resulting copolymer beads is conducted as in Example 1, except that no methylene chloride is slurried with the copolymer beads. The copolymer beads have a divinylbenzene content of 5.7 percent based on total monomer weight.

The resulting sulfonated, macroporous, cation-exchange resin is tested as in Example 1. The results are given in Table II for comparison with Examples 1-7 and Comparative Example A.

EXAMPLE 8

The procedure of Example 1 is substantially repeated, except that the resulting copolymer beads have a divinylbenzene content of 7 percent, based upon total monomer weight. The kettle is charged with a monomer phase consisting of 568.3 grams of styrene, 81.7 grams of the commercially available 55.7 percent divinylbenzene solution, 130 grams of iso-octane (an inert diluent level of 20 percent), 0.47 grams of the t-butyl peroctoate solution, and 0.31 grams of t-butyl perbenzoate. The monomer phase is suspended in a continuous aqueous phase which consists of 1.3 grams of the sodium dichromate solution, 234 grams of the aqueous CMMC solution, and 546 grams of water. Polymerization and sulfonation is conducted as in Example 1. All remaining procedures are the same. The resin has a DWC of 5.2 meq/g, a WRC in the calcium form of 48.5 percent, and a SF for fructose of 0.52.

COMPARATIVE EXAMPLE C

The procedure of Example 8 is substantially repeated, except no iso-octane is added. The kettle is charged with a monomer phase consisting of 437.2 grams of styrene, 62.8 grams of the commercially available 55.7 percent divinylbenzene solution, 0.36 grams of the t-butyl peroctoate solution, and 0.24 grams of t-butyl perbenzoate. The monomer phase is then suspended, under agitation, in a continuous aqueous phase which consists of 2.5 grams of the sodium dichromate solution, 450 grams of the aqueous CMMC solution, and 1050 grams of water. Polymerization and sulfonation is conducted as in Example 1. The copolymer beads have a divinylbenzene content of 7 weight percent based on total monomer weight. The resin has a DWC of 5.3 meq/g, a WRC in the calcium form of 45.0 percent, and an SF for fructose of 0.39. The results indicate that an increase of greater than 30 percent in SF and an increase of 8 percent in water retention capacity are obtained by the porous gel resin of Example 8 when compared to the otherwise similar conventional gel resin of Comparative Example C.

EXAMPLES 9-12

The procedure of Example 1 is substantially repeated, except that ethylbenzene is employed as the inert diluent. Also, copolymer beads prepared in Examples 10-12 have a divinylbenzene content of 7 percent based on total monomer weight, while those of Example 9 have a divinylbenzene content of 5.7 percent. The amounts of materials employed in each example are given in Table III. The resin properties and SF for fructose are given in Table IV.

TABLE III

RESIN PREPARATION DATA FOR EXAMPLES 9-12

| Example No. | Styrene (gms) | DVB Solution (gms) | Ethyl-benzene (gms) | T-BPO[1] (gms) | T-BPB[2] (gms) | Sodium Dichromate Solution | CMMC Solution (gms) | Water (gms) | Inert Diluent Level (3) (%) | % DVB in Copolymer (%) |
|---|---|---|---|---|---|---|---|---|---|---|
| 9 | 448.8 | 51.2 | 100 | 0.36 | 0.24 | 2.5 | 450 | 1050 | 20 | 5.7 |
| 10 | 437.2 | 62.8 | 50 | 0.36 | 0.24 | 2.5 | 450 | 1050 | 10 | 7.0 |
| 11 | 437.2 | 62.8 | 100 | 0.36 | 0.24 | 2.5 | 450 | 1050 | 20 | 7.0 |
| 12 | 437.2 | 62.8 | 200 | 0.36 | 0.24 | 2.5 | 450 | 1050 | 40 | 7.0 |

[1] t-BPO refers to tert-butylperoctoate
[2] t-BPB refers to tert-butylperbenzoate.
[3] Inert diluent level (%) = (grams diluent/grams styrene + divinylbenzene)*100.

TABLE IV

RESIN PROPERTIES FOR EXAMPLES 9-12

| Example No. | Percent DVB | Diluent Level (%) | WRC in H$^+$ Form (%) | WRC in Ca$^{++}$ Form (%) | DWC (meq/g) | S.F. |
|---|---|---|---|---|---|---|
| 9 | 5.7 | 20 | 61.0 | * | 5.3 | 0.60 |
| 10 | 7.0 | 10 | 56.2 | * | 5.3 | 0.51 |
| 11 | 7.0 | 20 | 57.6 | 49.0 | 5.3 | 0.63 |
| 12 | 7.0 | 40 | 65.0 | * | 5.3 | 0.63 |

*Not determined

EXAMPLE 13

The procedure of Example 1 is substantially repeated, except that toluene is employed as the inert diluent. The kettle is charged with a monomer phase consisting of 583.7 grams of styrene, 66.3 grams of the commercially available 55.7 percent divinylbenzene solution, 195 grams of toluene, 0.47 grams of the t-butyl peroctoate solution, and 0.31 grams of t-butyl perbenzoate. The monomer phase is suspended in an aqueous phase consisting of 1.4 grams of the sodium dichromate solution, 253.5 grams of the aqueous CMMC solution, and 591.5 grams of water. Polymerization and sulfonation is conducted as in Example 1. All remaining procedures are the same. The resin has a DWC of 5.3 meq/g, a WRC in the calcium form of 54.2 percent, and a SF for fructose of 0.69.

EXAMPLES 14-15

Chromatographic Performance Testing

A. Resin Preparation

The procedure of Example 1 is substantially repeated for Examples 14-15. The amount of materials employed in each example, as well as the inert diluent level, are given in Table V. The resulting porous gel copolymer beads have a divinylbenzene content of 5.7 percent.

TABLE V

RESIN PREPARATION DATA FOR EXAMPLES 14-15 AND COMPARATIVE EXAMPLES D-E

| Example No. | Styrene (gms) | DVB Solution (gms) | Iso-Octane (gms) | t-BPO[1] (gms) | t-BPB[2] (gms) | Sodium Dichromate Solution (gms) | CMMC Solution (gms) | Water (gms) | Inert[3] Diluent Level (%) |
|---|---|---|---|---|---|---|---|---|---|
| 14 | 1077.6 | 122.4 | 240 | 0.86 | 0.58 | 1.9 | 345 | 800 | 20 |
| 15 | 897.7 | 102.3 | 250 | 0.72 | 0.48 | 2.1 | 375 | 875 | 25 |
| D | 554.5 | 59.1 | 0 | 0.45 | 0.24 | 1.0 | 185 | 432 | 0 |
| E | 550.8 | 62.8 | 0 | 0.45 | 0.24 | 1.0 | 185 | 432 | 0 |

[1] t-BPO refers to tert-butylperoctoate.
[2] t-BPB refers to tert-butylperbenzoate.
[3] Inert diluent level (%) = (grams diluent/grams styrene + divinylbenzene)*100.

Polymerization and sulfonation of the resulting copolymer beads is conducted as in Example 1. Physical properties for the resins are given in Table VI.

TABLE VI
CHROMATOGRAPHIC DATA AND PHYSICAL PROPERTIES FOR EXAMPLES 14-15 AND COMPARATIVE EXAMPLES D-E

| Property | Example 14 | 15 | D | E |
|---|---|---|---|---|
| Resin Average Particle Diameter ($\mu$m) | 460 | 384 | 424 | 398 |
| WRC in $Ca^{--}$ form. (%) | 52.6 | 53.6 | 50.4 | 49.0 |
| WRC in $H^-$ form. (%) | 62.5 | 64.7 | 60.4 | 58.7 |
| DWC (meq/g) | 5.2 | 5.3 | 5.2 | 5.2 |
| Percent Yield of Fructose (%) | 40 | 42 | 31 | 34 |

B. Performance Testing

To test chromatographic performance for each resin, a 750 ml portion of the respective porous gel resin is placed in a 25 millimeter (mm) × 1280 mm jacketed glass chromatography column with an attached expansion column. The resin is backflushed with degassed, deionized water for 30 minutes which is followed by 1 hour of backflushing with an aqueous calcium chloride solution (7 g $CaCl_2$/100 ml solution). The resin is then equilibrated with the calcium chloride solution for at least 6 hours. The resin is tapped down to provide uniform packing and any resin protruding beyond the jacketed portion of the column is removed. The expansion column is removed and the column sealed. The column is thereafter flushed with degassed, deionized water and heated to a steady temperature of 60° C. by circulating hot water through the column jacket.

A total of about 78 ml of a hot (60° C.) commercial high fructose corn syrup of 50 percent dissolved solids content is fed to the column at a rate of 11-13 ml/min. The approximate composition of the solids is fructose: 42 percent; glucose: 55 percent; oligosaccharides: 3 percent. Immediately after the syrup is loaded on the column, it is eluted with 60° C. degassed, deionized water, again at a rate of about 11-13 ml/min. Samples of column effluent are collected at half-minute intervals and quantitatively analyzed for the individual components eluting from the column. The experiment is continued until the produce stream contains less than 0.5 percent dissolved solids. The glucose is eluted faster than the fructose, so the earlier fractions are rich in glucose and the later fractions are rich in fructose. The percent yield of 80 percent fructose for each resin is reported in Table VI.

Percent yield is determined from the consecutive samples collected at the end of the experiment which cumulatively have a fructose purity of 80 percent, i.e., the weight ratio of fructose to total carbohydrates contained in the samples is 80 percent. The percent yield is 100 times the total amount of fructose contained in those samples divided by the total amount of fructose recovered before the experiment is terminated. The percent yield is a measure of the comparative separation efficiency of different resins.

COMPARATIVE EXAMPLES D-E

The procedure of Examples 14-15 is substantially repeated to prepare two otherwise similar conventional gel resins and compare their chromatography performance with that of Examples 14-15. The amount of materials employed in preparing the copolymer beads, as well as the inert diluent levels, are also given in Table V. The copolymer beads prepared in Comparative Example D have a divinylbenzene content of 5.4 percent, while those of Comparative Example E have a divinylbenzene content of 5.7 percent. After sulfonation, the conventional gel resins are each tested to determine WRC and DWC as in Example 1. Volume average particle size is determined on a HIAC Criterion Model PC-320 particle size analyzer. The physical properties are given in Table VI for comparison with Examples 14-15.

The glucose/fructose separation described in Examples 14-15 is substantially repeated with each conventional gel resin. The separation results are given in Table VI. The resin of Example 14 provides a better separation relative to an otherwise similar conventional gel resin (Comparative Example D) under substantially similar operating conditions, as evidenced by a 29 percent increase in percent yield of fructose. The resin of Example 15 provides a 23 percent improvement in yield compared to an otherwise similar conventional ge resin (Comparative Example E).

EXAMPLE 16

Example 16 concerns separation performance of cation-exchange resins made from porous gel copolymer beads prepared in a multi-stage process. The beads are prepared by substantially following Example 1 of U.S. Pat. No. 4,564,644.

A 3 liter reactor is loaded, under agitation, with 250 grams of seed copolymer particles and 700 grams of water. The seed copolymer particles are 0.75 percent by weight cross-linked styrene/divinylbenzene copolymer particles having a volume average particle diameter of 220 $\mu$m. Thereafter, the reactor is charged with a first monomer mixture containing 70 grams of styrene, 15 grams of a commercially available divinylbenzene mixture, and 0.40 grams of a 50 percent t-butyl peroctoate solution with 0.30 grams of t-butyl perbenzoate as polymerization initiators. The divinylbenzene mixture is obtained from The Dow Chemical Company and consists of 55 weight percent divinylbenzene, the balance of the mixture being essentially ethylvinylbenzene. The first monomer mixture has a divinylbenzene content of 10 percent. The seed copolymer particles are allowed to imbibe the monomers and initiator over a 30 minute period.

Thereafter, an additional 280 grams of water, 20 grams of an aqueous one percent sodium lauryl sulfate solution, 1.50 grams each of gelatin A and B, and 3.50 grams of a 58 percent aqueous sodium dichromate solution are added to the reactor. The reactor is sealed, purged with nitrogen, and the reactor contents maintained at a temperature of 78° C. for 100 minutes to obtain partial conversion of the monomers.

Thereafter, a second monomer mixture is continuously fed to the reactor at a rate of 2.6 grams per minute over a 364 minute period. The second monomer mixture contains 660 grams of styrene, 80 grams of the divinylbenzene mixture, and 320 grams of toluene as an inert diluent. The second monomer mixture has a divinylbenzene content of 6 percent based upon the total weight of the second monomer mixture. The inert diluent level is 30 percent. The reactor contents are maintained at 78°

C. during addition of the second monomer mixture and, thereafter, for another 8 hours. The polymerization is concluded by heating the reactor contents at 110° C. which is maintained for an additional 2 hours. The resulting copolymer beads are recovered from the reactor and sulfonated as in Example 1.

The beads are analyzed to determine their properties and ability to separate fructose from glucose as in Examples 14-15. The beads exhibit a volume average particle diameter of 490 μm in the calcium form and have a divinylbenzene content of 5 percent, based on total weight of the monomers employed. Resin WRC is measured as 56 percent in the calcium form and 68 percent in the hydrogen form. Dry weight capacity is 5.4 meq/g. The percent yield of 80 percent fructose is 42 percent.

EXAMPLE 17

The procedure of Example 16 is substantially repeated, except that ethylbenzene is employed as the inert diluent and it is added to the monomers used in making the seed particles, rather than in the second monomer mixture.

The seed particles are prepared by suspension polymerization of an initial monomer mixture containing 1113 grams of styrene, 87.3 grams of the divinylbenzene mixture, and 380 grams of ethylbenzene. The resulting seed particles contain 4 weight percent divinylbenzene based on total weight of the monomers, and have particle sizes ranging from about 250 to 500 μm. The inert diluent level employed is 24 percent.

The reactor is loaded, under agitation, with 533 grams of the seed copolymer particles and 900 grams of water. Thereafter, the reactor is charged with a first monomer mixture containing 214 grams of styrene, 21.2 grams of the divinylbenzene mixture, and 0.85 grams of a 50 percent t-butyl peroctoate solution with 0.44 grams of t-butyl perbenzoate as polymerization initiators. The first monomer mixture has a divinylbenzene content of 5 percent. The seed copolymer particles are then allowed to imbibe the monomers and initiator over a 60 minute period.

Thereafter, an additional 275 grams of water, 24 grams of an aqueous 1 percent sodium lauryl sulfate solution, 1.5 grams each of gelatin A and B, and 3.6 grams of a 58 percent aqueous sodium dichromate solution are added to the reactor. The reactor is sealed, purged with nitrogen, and the reactor contents maintained at a temperature of 80° C. for 60 minutes to obtain partial conversion of the monomers.

Thereafter, a second monomer mixture is continuously fed to the reactor at a rate of 2.62 grams per minute over a 304 minute period. The second monomer mixture contains 842 grams of styrene and 48 grams of the divinylbenzene mixture. The second monomer mixture has a divinylbenzene content of 3 percent based upon the total weight of the second monomer mixture. The reactor contents are maintained at 80° C. during addition of the second monomer mixture and, thereafter, for another 8 hours. Polymerization is concluded by heating the reactor contents to 110° C. for an additional 1.5 hours. The resulting copolymer beads are recovered and sulfonated as in Example 1.

The beads are analyzed to determine their properties and ability to separate fructose from glucose as in Examples 14-15. The beads exhibit a volume average particle diameter of 480 μm and have a weight of the monomers employed. Resin WRC is measured as 48.5 percent in the calcium form. The percent yield of 80 percent fructose is 47 percent.

What is claimed is:

1. A process for the chromatographic separation of a liquid mixture having a first sugar component and at least one secondary component selected from the group consisting of second sugars, organic acids, amino acids, alcohols, and inorganic salts, into a first recoverable product stream rich in the first sugar component and at least one second recoverable product stream rich in the secondary components, the process comprising:

(a) contacting the liquid mixture with a stratum of a porous gel cation-exchange resin having a water retention capacity of at least about 40 percent, the resin comprising a plurality of porous gel copolymer beads functionalized with cation-exchange groups, the porous gel copolymer beads having microporosity and mesoporosity but essentially no macroporosity, the beads being prepared by polymerization of at least one monovinylidene monomer with a cross-linking monomer in the presence of an amount of an inert diluent sufficient to increase the water retention capacity of the resin at least about one percent when compared to the water retention capacity of an otherwise similar gel resin prepared from copolymer beads made without diluent; and (b) eluting the liquid mixture such that the first sugar component passe through the resin at a rate which is different relative to the rate at which the secondary components pass through the resin such that the first recoverable product stream and the second recoverable product streams re obtained thereby.

2. The process of claim 1 wherein the liquid mixture is eluted with water.

3. The process of claim 1 wherein the cation-exchange groups are sulfonic acid groups or salts thereof.

4. The process of claim 1 wherein the cation-exchange groups are associated with a counterion selected from the group consisting of hydrogen ion, an ammonium ion, and a metal ion.

5. The process of claim 4 wherein the metal ion is calcium.

6. The process of claim 1 wherein the effective amount of inert diluent is sufficient to provide an inert diluent level of from about 5 to about 50 percent.

7. The process of claim 1 wherein the effective amount of inert diluent is sufficient to yield an increase of from about 1 to about 15 percent in water retention capacity for the porous gel cation-exchange resin in comparison to the water retention capacity for an otherwise similar gel resin prepared from copolymer beads made without diluent.

8. The process of claim 1 wherein the effective amount of inert diluent is sufficient to yield an increase of from about 2 to about 7 percent in water retention capacity for the porous gel cation-exchange resin in comparison to the water retention capacity for an otherwise similar gel resin prepared from copolymer beads made without diluent.

9. The process of claim 1 wherein the at least one monovinylidene monomer is selected from the group consisting of styrene, vinylbenzylchloride, a monoalkyl-substituted styrene, and a halo-substituted styrene.

10. The process of claim 1 wherein the cross-linking monomer is selected from the groups consisting of divinylbenzene divinyltoluene, divinylxylene, divinylnaphthalene, trivinylbenzene, divinyldiphenylether, divinyldiphenylsulfone, and mixture thereof.

11. The process of claim 1 wherein the cross-linking monomer is present in an amount of from about 1 to about 10 weight percent based upon total weight of the monovinylidene and cross-linking monomers.

12. The process of claim 1 wherein the cross-linking monomer is present in an amount of from about 4 to about 7 weight percent based upon total weight of the monovinylidene and cross-linking monomers.

13. The process of claim 1 wherein the inert diluent is selected from the group consisting of pentane, hexane, heptane, iso-octane, toluene, ethylbenzene, diethylbenzene, benzene, xylene, ethylene dichloride, methylene chloride, trichloroethylene, and mixtures thereof.

14. The process of claim 1 wherein the porous gel cation-exchange resin has a water retention capacity in the hydrogen form of from about 45 to about 85 percent on a fully functionalized basis.

15. The process of claim 1 wherein the porous gel cation-exchange resin has a water retention capacity in the hydrogen form of from about 60 to about 65 percent on a fully functionalized basis.

16. The process of claim 1 wherein the porous cation-exchange resin has a volume average particle diameter of from about 100 to about 100 $\mu$m.

17. The process of claim 1 wherein the porous gel copolymer is prepared in a single-stage polymerization process.

18. The process of claim 1 wherein the porous gel copolymer is prepared in a multi-stage polymerization process.

19. The process of claim 18 wherein, in a last polymerization stage of the multi-stage process, a monomer mixture comprising monovinylidene monomer, cross-linking monomer, and substantially no free-radical initiator, is added under polymerizing conditions to free radical-containing copolymer particles formed in one or more preceding polymerization stages, the addition resulting in imbibition and polymerization of the monomer mixture in the copolymer particles.

20. The process of claim 19 wherein the copolymer particle has from about 0.1 to about 8 weight percent cross-linking monomer based on the weight of all monomers employed in making the copolymer particle.

21. The process of claim 19 wherein the monomer mixture contains from about 1 to about 15 weight percent cross-linking monomer based on the weight of all monomers in the mixture.

22. The process of claim 19 wherein the inert diluent is added to at least one polymerization stage which employs t least about 2 weight percent cross-linking monomer based on total weight of monomers employed in such stage.

23. The process of claim 1 wherein the first sugar component is selected from the group consisting of glucose, fructose, lactose, sucrose, maltose, gulose, galactose, sorbose, xylose, mannose, isomaltose, stachyose, arabinose, tagatose, raffinose, and oligosaccharides.

24. The process of claim 1 wherein the second sugars are selected from the group consisting of glucose, fructose, lactose, sucrose, maltose, gulose, galactose, sorbose, xylose, mannose, isomaltose, stachyose, arabinose, tagatose, raffinose, and oligosaccharides.

25. The process of claim 1 wherein the at least one secondary component is a second sugar.

26. The process of claim 1 wherein the first sugar component is fructose and the at least one secondary component is glucose.

27. The process of claim 1 wherein the at least one secondary component is selected from the group consisting of inorganic salts, amino acids, alcohols, organic acids, and salts of organic acids.

28. The process of claim 1 wherein the first sugar component is recovered at a percent yield which is at least about 5 percent greater than the percent yield obtained when an otherwise similar gel resin prepared from copolymer beads made without diluent is employed in the process under substantially similar operating conditions.

29. The process of claim 1 wherein the first sugar component is recovered at a percent yield which is at least about 20 percent greater than the percent yield obtained when an otherwise similar gel resin prepared from copolymer beads made without diluent is employed in the process under substantially similar operating conditions.

30. The process of claim 1 wherein the porous gel resin has a separation factor for the first sugar component of at least about 5 percent greater than the separation factor of an otherwise similar gel resin prepared from copolymer beads made without diluent.

31. The process of claim 1 wherein the porous gel resin has a separation factor for the first sugar component of at least about 20 percent greater than the separation factor of an otherwise similar gel resin prepared from copolymer beads made without diluent.

* * * * *

UNITED STATES PATENT AND TRADEMARK OFFICE
CERTIFICATE OF CORRECTION

PATENT NO. : 5,176,832

DATED : January 5, 1993

INVENTOR(S) : Antonio Dorta; Yog R. Dhingra; Bruce W. Pynnonen

It is certified that error appears in the above-identified patent and that said Letters Patent is hereby corrected as shown below:

Title page,
item [75] Inventors should read --Antonio Dorta; Bruce W. Pynnonen; Yog R. Dhingra--.

Column 20, line 29, "passe" should read --passes--.

Column 20, line 33, "re" should read --are--.

Column 21, line 26, "100 to about 100" should read --100 to about 1000--.

Column 22, line 3, "t" should read --at--.

Signed and Sealed this

Fifth Day of April, 1994

Attest:

BRUCE LEHMAN

*Attesting Officer*     *Commissioner of Patents and Trademarks*